UNITED STATES PATENT OFFICE.

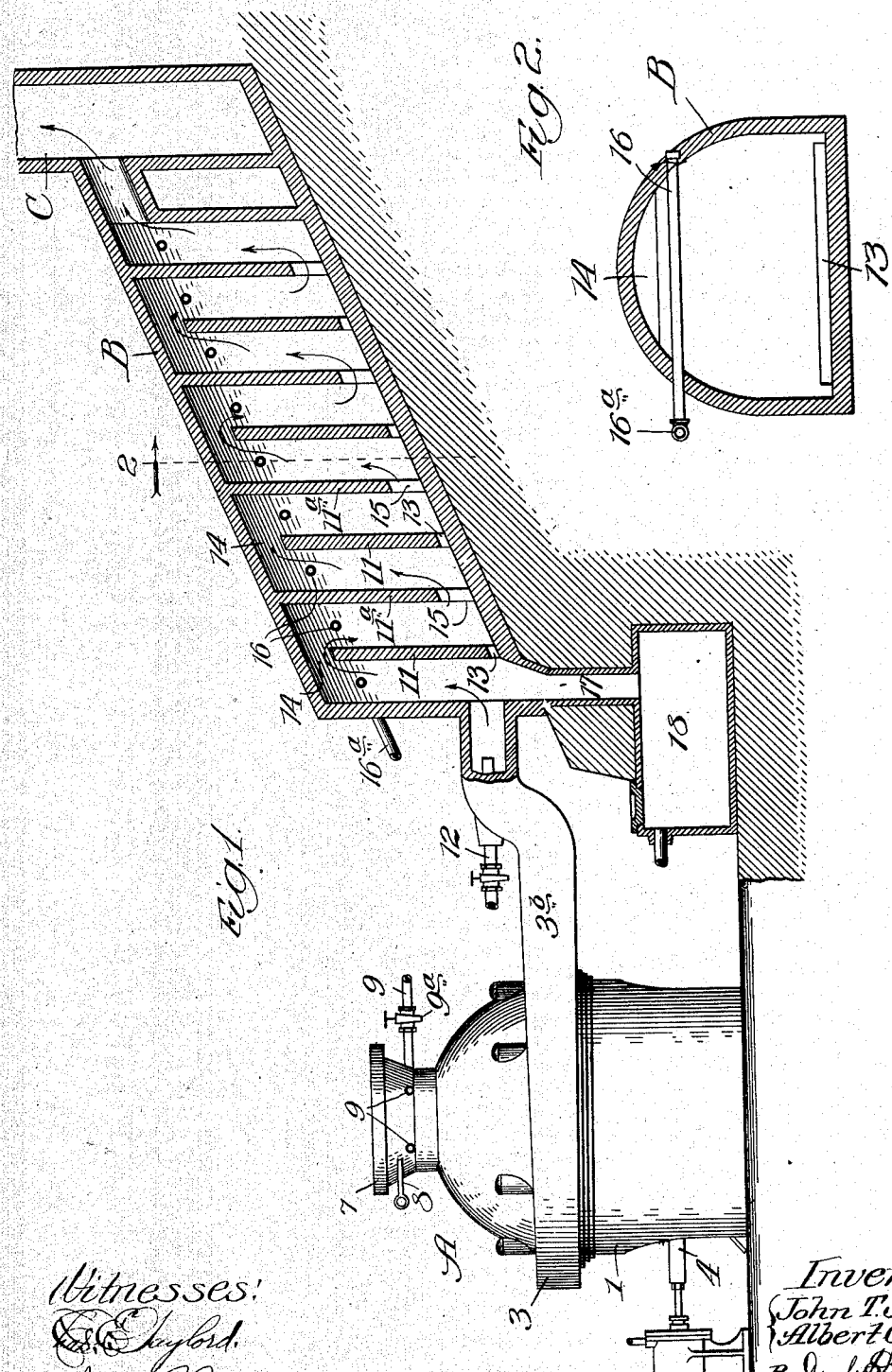

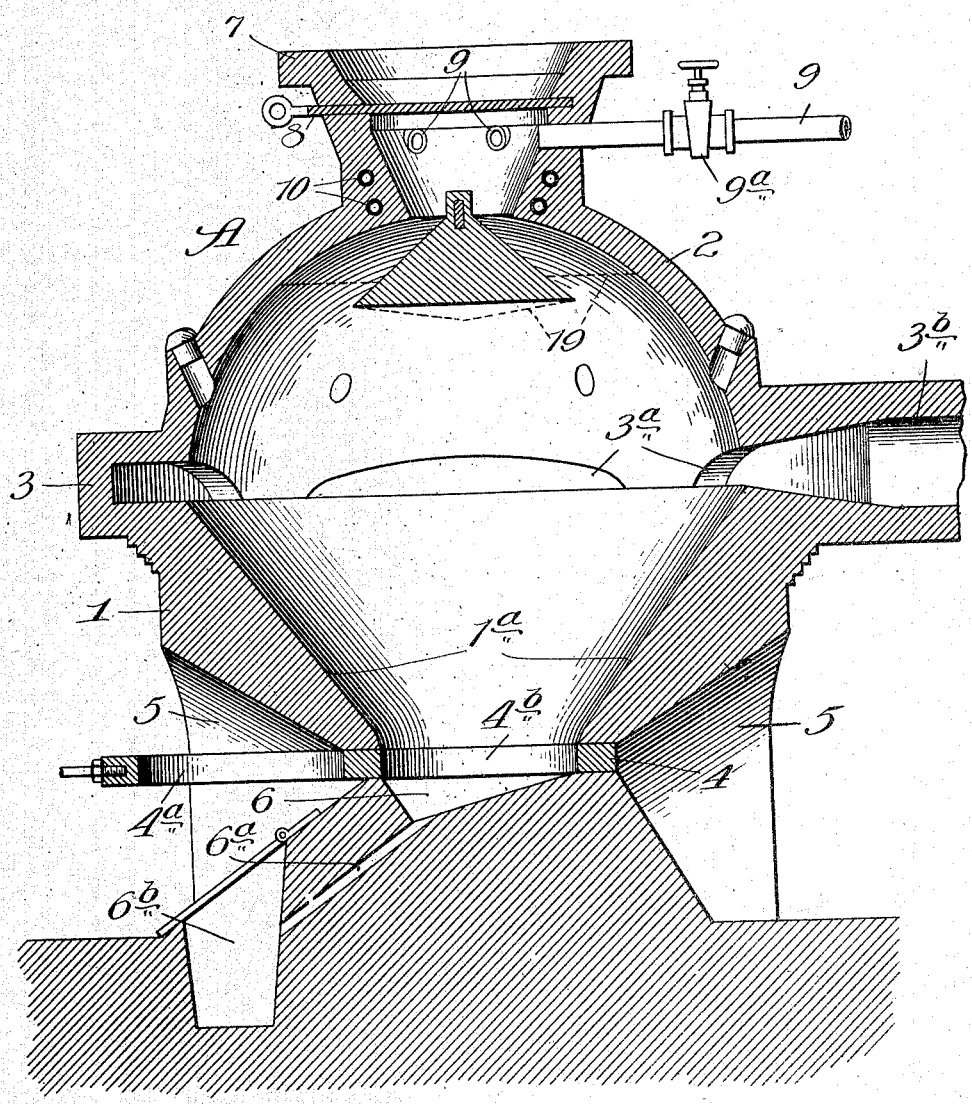

JOHN T. JONES AND ALBERT G. JONES, OF IRON MOUNTAIN, MICHIGAN, ASSIGNORS TO NEW METALS-PROCESS COMPANY, OF CHICAGO, ILLINOIS, A CORPORATION OF ILLINOIS.

METAL-RECOVERING PROCESS AND APPARATUS.

1,174,731.  Specification of Letters Patent.  Patented Mar. 7, 1916.

Application filed March 26, 1914, Serial No. 827,477. Renewed January 20, 1916. Serial No. 73,215.

*To all whom it may concern:*

Be it known that we, JOHN T. JONES and ALBERT G. JONES, citizens of the United States, residing at Iron Mountain, in the county of Dickinson and State of Michigan, have invented a new and useful Improvement in Metal-Recovering Processes and Apparatus, of which the following is a specification.

The present invention relates to a process for metallizing ores containing metals which volatilize at a low temperature, notably zinc and lead, which volatilize at a temperature of approximately 2200° F.

The primary object is to provide a thoroughly practicable direct process and apparatus for metallizing zinc and lead oxids and carbonates. The purpose is to de-oxidize the ores and recover the metals, without effecting any general fusing of the earthy constituents, or gangue, or producing a bath of the earthy constituents. Because of the fact that zinc and lead volatilize at about the de-oxidizing temperature, special provision is necessary to secure the desired results. According to the present process, the metals are volatilized (whether in combined form, or not, is immaterial) in a de-oxidizing atmosphere; and the de-oxidizing gases are passed through a combustion-chamber where the metals are recovered as oxids, and any sulfur which may be present is consumed and carried off through the stack.

According to the preferred method of practising the process herein described, the ore, preferably crushed to one inch dimensions or smaller, is mixed with several times its volume of coke or charcoal, together with a relatively small amount of fuel containing hydro-carbons, such as bituminous coal or wood; and the charge is introduced into a de-oxidizing chamber where the ore-lump groups, or ore-portions, are maintained practically isolated and surrounded by the fuel; and a temperature is provided which is sufficient to effect de-oxidation and vaporization of the metals, but without producing a bath of the earthy constituents of the ore. The de-oxidizing gas and metal vapors are then passed through a combustion-chamber in which the gases are burned and the metals recovered in oxid form, after which the oxids are subjected to any desired process to recover the free metals. The unconsumed solid coke (or charcoal) and the gangue in solid form are removed by means of a discharging-device at the bottom of the de-oxidizing chamber, and the coke is separated and fed again through the furnace with a fresh charge of ore and a sufficient amount of fresh fuel to maintain the proportions. Any metals which may come down through the de-oxidizing chamber without vaporizing, or which may cool to a liquid in the de-oxidizing chamber, will coalesce in pools or globules and may run together and be recovered at the bottom of the de-oxidizing chamber.

The accompanying drawings illustrate apparatus adapted to practise the improved process.

In the drawings, Figure 1 represents an elevational view, partly in section, of the preferred apparatus for practising the process; Fig. 2 represents a section taken as indicated at line 2 of Fig. 1; and Fig. 3 represents an enlarged sectional view of the de-oxidizing chamber.

In the construction illustrated, A represents a de-oxidizing chamber; B, a combustion and oxid-collecting chamber; C, a smoke-stack with which the chamber B communicates at its upper end. The de-oxidizing chamber A preferably is of circular form and provided with a base-portion 1 surmounted by a dome 2. At the junction of the base-portion and dome is a bustle-pipe, or annular flue, 3, with which the interior of the chamber communicates through passages $3^a$. The flue $3^b$ leads from the bustle-pipe 3 to the chamber B.

The base-portion 1 is provided with the interior downwardly-convergent frusto-conical surface $1^a$, at the lower end of which is provided a discharge-device 4 which is shown in the form of a slide which may be hydraulically actuated. The slide 4 is provided with chambers or passages $4^a$ and $4^b$, which are adapted to discharge the solid materials through lateral openings 5 in the base-portion 1. A shallow collecting-chamber 6 below the slide 4 may serve to collect any fluid metals and discharge the same through a pipe 6ª to a tank or container 6ᵇ.

The upper end of the chamber A is provided with a hopper 7 fitted with a slide or closure 8. Below the closure 8 is a twyer or twyers 9 provided with air-regulating means 9ª. Water coils 10 may be used at the neck-portion of the de-oxidizing-chamber for cooling purposes.

The combustion-chamber B may comprise an inclined shell having refractory walls and provided interiorly with a series of baffle-walls 11, 11ª. The flue 3ᵇ communicates with the lower end of the chamber B, and means 12 are provided for supplying air for combustion purposes. The walls 11 have water-passages 13 at their lower ends and flue-passages 14 at their upper ends. The walls 11ª have passages 15 at their lower ends which are higher than the passages 13 and serve both as water-passages and flue-passages. The gases are caused to follow the zig-zag path indicated by the arrows. A series of sprinkling-pipes 16 connected with a common supply-pipe 16ª are provided, the purpose being to supply sufficient water to wash the oxids downwardly along the lower wall of the chamber and discharge them through a pipe 17 into a container 18.

The smoke-stack C is preferably of ample capacity and height to enable the operation to be carried on by natural-draft.

The twyers 9 should be of sufficient size to supply air in sufficient quantity to maintain a de-oxidizing and vaporizing temperature and supply the de-oxidizing gases. The twyer 12 should be of sufficient size to supply ample air for combustion purposes.

In the practice of the process, charges of ore and fuel are, from time to time, introduced through the hopper 7, the closure 8 being withdrawn to permit this operation, and then closed. The fuel is preferably mainly in the form of large lumps or blocks adapted to space or isolate the ore-portions and envelop them with solid carbonaceous fuel. The fuel is preferably several times as heavy as the ore and many times the volume of the ore. For illustration, the ore and fuel may be mixed in the proportions of 250 pounds of ore, 400 pounds of coke, and 100 pounds of bituminous coal, the volume of the fuel thus being many times the volume of the ore. The chamber A is kept practically full, the fresh charges of ore and fuel being introduced from time to time. In Fig. 3, the dotted lines 19 may indicate the upper surface of the ore and fuel body. The operation is carried on under conditions to produce a hot zone at the upper portion of the ore body, the temperature preferably considerably exceeding 2000° F. at this zone, sufficient air being supplied through the twyers 9 to effect this result. Carbon dioxid is formed in the upper zone, and this changes to a de-oxidizing gas a short distance below the upper end of the chamber. The temperature falls as the lower portion of the de-oxidizing chamber is approached. The de-oxidizing gases pass through the flue 3ᵇ, carrying with them the metal vapors. Air is introduced through the twyer 12, and complete combustion is effected in the chamber B, the products of combustion passing off through the stack C. Any sulfur which may be present is burned, while the oxids produced drop to the bottom of the chamber B and are washed out through the pipe 17 to the container 18. The oxids are removed from the chamber 18 and treated according to any known or desired process to recover the free metals.

The unused coke and gangue in solid form settle down through the lower portion of the chamber A, and the device 4 is operated from time to time to discharge portions of the coke and gangue in solid form through the openings 5. Any metals which may be cooled or condensed in the lower portion of the chamber A will collect in small pools or globules on the solid fuel, and may run together in the depressions 6 and pass to the collecting-tank 6ᵇ. Any metals which may become "frozen" will be discharged with the coke and gangue through the openings 5. The coke may be separated and used again, so that any metal globules which may adhere will, in the next passage through the chamber A, be fused and vaporized, or vaporized and coalesced with other metal particles and collected at the bottom of the de-oxidizing chamber.

In place of coke and coal, charcoal and wood may be employed as fuel, in which case the volume of fuel, as compared with the volume of ore, will be disproportionately greater. The wood may be 16 inch cord-wood or slab-wood, and fresh charcoal will be continuously formed in the operation to replenish the charcoal which is consumed.

It may be noted that the relative small amount of coal or wood which is employed from time to time to replenish the coke or charcoal furnishes hydrocarbons which aid in the reducing action. The temperature should not be so high as to effect any general fusing of the slag constituents of the ore, and the use of so large an excess of solid fuel aids in preventing the formation of a bath as well as serving to envelop or isolate the ore-portions which are undergoing reduction.

It is desirable to employ a de-oxidizing chamber which will cause the mixture of fuel and ore to assume the form of a relatively-low stack so that the gases may be drawn readily through the mixture without the expenditure of great power. Thus, natural-draft may be employed, or, if air be supplied under pressure, the power which will be required to operate the air-blast will be small. A furnace having a diameter at the bustle-line of 20 feet preferably has a height above the bustle-line of approximately 10 feet. The air twyers 9 may be of a diameter of 20 inches, in which case six or eight twyers should furnish ample air. In some cases, it may be desirable to employ blocks of resistant material, such as silica boulders, to serve as spacers. In such case, the fuel might be supplied in any desired form, and the proportion of fuel would need to be only sufficiently great to maintain the best de-oxidizing conditions. The combustion-chamber B may have a cross-sectional area of 20 square feet or more, and may be 100 feet or more in length.

What we regard as new and desire to secure by Letters Patent is—

1. The process of recovering metals having a low volatilizing point, which consists in subjecting, in a de-oxidizing chamber, a charge of ore mixed with fuel of several times its volume and sufficient to maintain the ore-groups in substantial isolation, to a de-oxidizing and vaporizing temperature, maintaining a de-oxidizing medium, without forming a bath of the slag-making constituents of the ore, and passing the de-oxidizing gases and metal vapors to a combustion-chamber, supplying sufficient air thereto to effect combustion, and recovering the metals in oxid form from said combustion-chamber.

2. The process of recovering metals having a low volatilizing point, which consists in subjecting, in a de-oxidizing chamber, a charge of ore mixed with lump fuel of several times its volume and sufficient to maintain the ore-groups in substantial isolation, to the action of a limited air-supply introduced therein and thus maintaining a de-oxidizing and vaporizing medium, without forming a bath of the slag-making constituents of the ore, passing the de-oxidizing gases and metal vapors to a combustion-chamber, supplying sufficient air thereto to effect combustion, recovering the metals in oxid form from said combustion-chamber, and removing, from time to time, unconsumed portions of the fuel and the gangue in solid form at the bottom of the de-oxidizing chamber.

3. The process of recovering metals having a low volatilizing point, which consists in subjecting, in a de-oxidizing chamber, a charge of ore mixed with lump fuel of several times its volume and sufficient to maintain the ore-groups in substantial isolation, to a de-oxidizing and vaporizing temperature, maintaining a de-oxidizing medium, without forming a bath of the slag-making constituents of the ore, passing the de-oxidizing gases and metal vapors to a combustion-chamber, supplying sufficient air thereto to effect combustion, recovering the metals in oxid form from said combustion-chamber, removing, from time to time, unconsumed portions of the fuel and the gangue in solid form at the bottom of the de-oxidizing chamber, recovering the unconsumed fuel, and re-charging the same with sufficient fresh fuel to maintain the proportions again through the de-oxidizing chamber.

4. The process of recovering metals having a low volatilizing point, which consists in heating, in a de-oxidizing chamber, a mixture of ore and infusible spacing-lumps of several times the volume of the ore and serving practically to isolate the ore-lump groups, maintaining in the chamber a de-oxidizing gas and a temperature sufficient to de-oxidize and vaporize the metals, and passing the de-oxidizing gas with the metal vapors through a combustion-chamber and recovering the metals in oxid form.

5. The process of recovering metals having a low oxidizing point, which consists in maintaining, in a de-oxidizing chamber, a low stack of ore mixed with several times its volume of solid fuel, supplying air to the upper portion of said de-oxidizing chamber in sufficient quantity to provide a de-oxidizing and vaporizing zone, without forming a bath of the earthy constituents of the ore, passing the de-oxidizing gases and metal vapors through a combustion-chamber and supplying air thereto and recovering the metals in oxid form, removing portions of the unconsumed fuel and the gangue in solid form at the base-portion of the de-oxidizing chamber from time to time, and re-charging the unconsumed fuel together with a fresh charge of ore and sufficient fresh fuel to maintain the proportions again into the upper portion of the de-oxidizing chamber.

6. In an apparatus for recovering metals having a relatively low fusing point, the combination of a de-oxidizing chamber provided at its base-portion with means for discharging unconsumed fuel and gangue in solid form, means for charging a mixture of ore and fuel into the upper portion of said chamber, means for supplying air in limited quantities to the upper portion of said chamber, a combustion-chamber communicating with the middle portion of said de-oxidizing chamber, and means for collecting metal values from the combustion-chamber.

7. In an apparatus for recovering metals having a relatively low fusing point, the combination of a de-oxidizing chamber provided at its base-portion with means for discharging unconsumed fuel and gangue in solid form, means for charging a mixture of ore and fuel into the upper portion of said chamber, means for supplying air in limited quantities to the upper portion of said chamber, a combustion-chamber provided with a tortuous passage and communicating with the middle portion of the de-oxidizing chamber, a smoke-stack communicating with said combustion-chamber, and means for collecting metal values from the combustion-chamber.

JOHN T. JONES.
ALBERT G. JONES.

In the presence of—
NELLIE B. DEARBORN,
OTTILIE C. AVISUS.